2 Sheets--Sheet 1.

G. W. VAN GORDER.
Sulky-Plows and Harrows.

No. 148,585. Patented March 17, 1874.

Witnesses.
A. F. Cornell.
C. H. Morgan.

Inventor.
G. W. Van Gorder.
Per. Burridge & Co.
Attys.

UNITED STATES PATENT OFFICE.

GEORGE W. VAN GORDER, OF WARREN, OHIO.

IMPROVEMENT IN SULKY-PLOWS AND HARROWS.

Specification forming part of Letters Patent No. 148,585, dated March 17, 1874; application filed December 17, 1873.

*To all whom it may concern:*

Be it known that I, GEORGE W. VAN GORDER, of Warren, in the county of Trumbull and State of Ohio, have invented a certain new and Improved Sulky-Plow and Harrow Combined, of which the following is a complete description, reference being had to the accompanying drawings making part of this specification.

Figure 1:
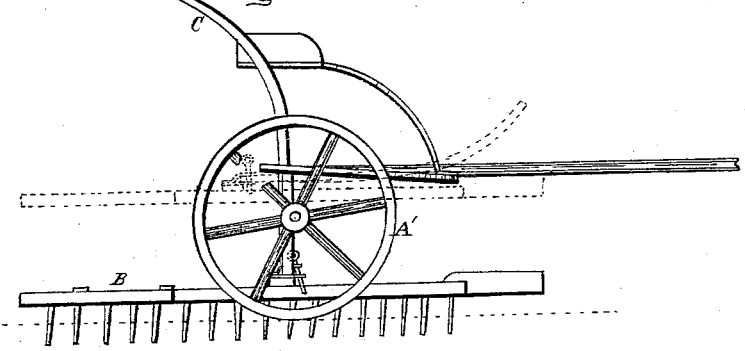
Figure 2:
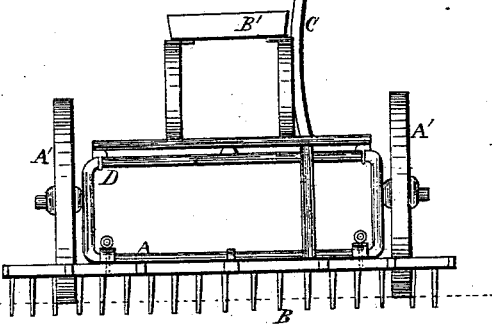
Figure 3:
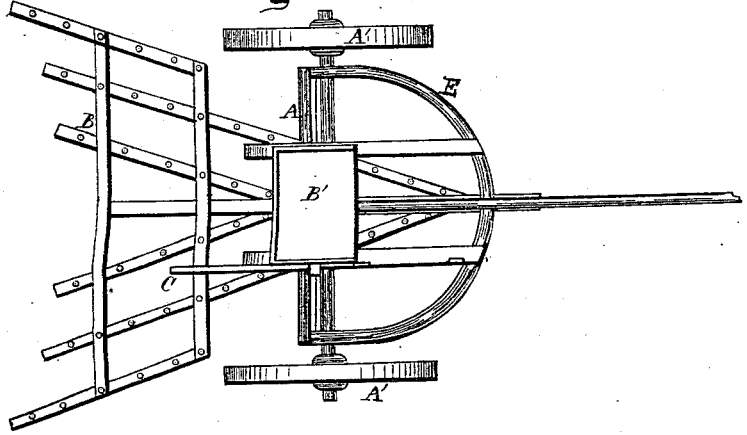

Figure 1 is a side view of a sulky, having attached thereto a harrow. Fig. 2 is a view of the rear end. Fig. 3 is a plan view. Fig. 4 is a view of the sulky, having attached thereto a plow. Fig. 5 is a plan view.

Like letters of reference refer to like parts in the several views.

The nature of this invention relates to the construction of a sulky, to which is attached a harrow for harrowing plowed land, or to which may be attached a plow for plowing said land, the invention being an improvement of a sulky-harrow for which a patent was granted to me March 4, 1873.

In my patented sulky-harrow referred to the axle-tree of the sulky was bent at right angles back from the axial line of the wheels, forming a rectangular offset or projection similar to the offset A in Figs. 2 and 5, to the bar of which the harrow B was attached, as shown in the drawings, Plate 1. It will be seen that the weight of the harrow is all on one side of the axle-tree, and some distance therefrom. In order to raise and lower the harrow, a lever corresponding to the lever C was attached to the bar A, having the axle-tree for a fulcrum, on which axle-tree the driver's seat B' was also secured. In this arrangement of the harrow, lever, and seat, it was found to require too much effort to raise the harrow by means of the lever, as the leverage was necessarily short. In order to avoid this difficulty in raising the harrow, I have, in this my new machine, formed an offset, D, Figs. 2 and 5, on the opposite side of the axle, on which is secured the frame E, seat B', and lever, thereby bringing the weight of the frame, seat, and the operator, when thereon, on the opposite side of the axis of the wheels A' from that of the harrow. By this arrangement I am enabled to counterbalance the weight of the harrow, the result of which is the harrow can be raised with much less labor by means of the lever than it can be in my former sulky-harrow.

In the event the harrow is not needed for immediate use, it can be detached from the sulky, and, instead of the harrow, a plow, F, Fig. 4, may be attached to the bar of the offset, as shown in Fig. 5, and the sulky used in the labor of plowing. The attachment of the plow to the offset is, by means of a clip, G, secured to the beam of the plow in a rigid manner, but which embraces the bar of the offset loosely, and confined thereto by a pin, *a*, inserted in the clip on the opposite side of the bar to which it is attached, as shown in Fig. 5.

In attaching the plow to the sulky in the manner as described, it is allowed a free lateral movement, and, at the same time, permitted a free movement vertically, so that it may run freely in the ground, and adjust itself to the various movements of the sulky.

The plow and harrow are not driven by the sulky, but directly by the team, to which they are attached by double-trees, &c., the object of the sulky being to steady the movements of the plow and harrow in the course of the work, and to release the operator from the hardship of walking during the process of the work.

What I claim as my invention, and desire to secure by Letters Patent, is—

The frame A D, having the wheel-spindles attached near to the center of the ends, and the harrow or plow attached to one side, in combination with the lever C and the bow E, carrying the seat, and resting upon the other side of said frame, substantially in the manner as described, and for the purpose set forth.

GEORGE W. VAN GORDER.

Witnesses:
W. H. BURRIDGE,
A. F. CORNELL.

E. R. WETHERED.
Hammocks or Lounges.
No. 148,586.           Patented March 17, 1874.
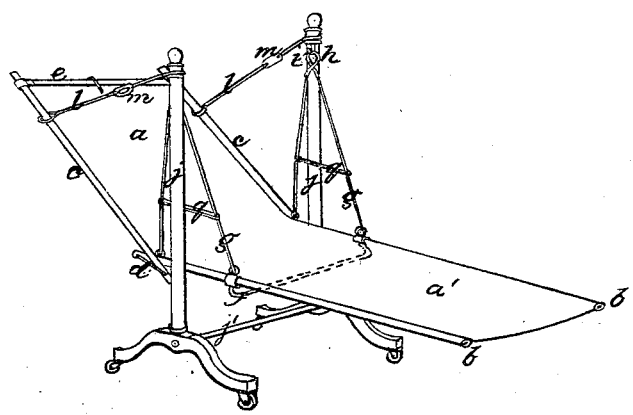
Fig. 1.
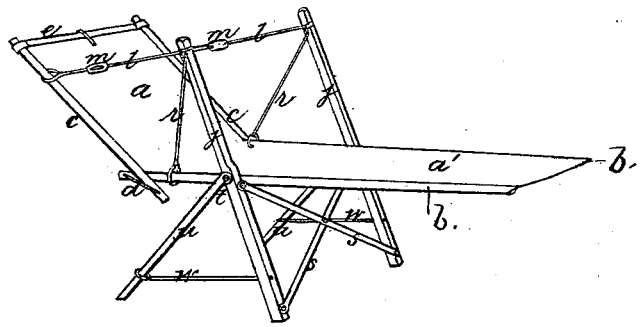
Fig. 2.
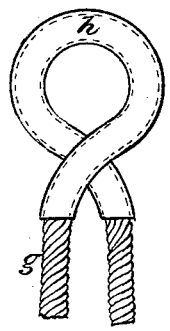  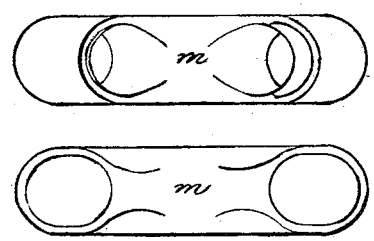
Fig. 3.    Fig. 4.        Fig. 5.
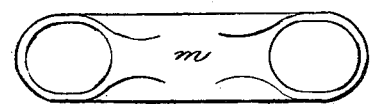
Fig. 6.
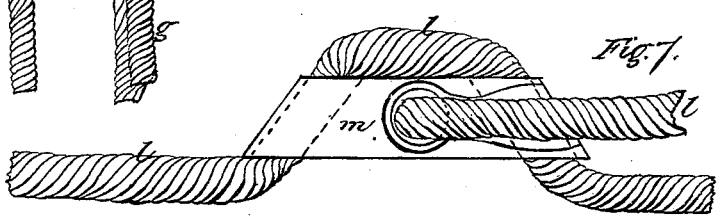
Fig. 7.
Witnesses:
W. H. Gilbee
G. F. Redfern.
Inventor:
E. R. Wethered